United States Patent
Higashino et al.

(10) Patent No.: US 12,034,818 B2
(45) Date of Patent: Jul. 9, 2024

(54) IN-VEHICLE INFORMATION PROCESSING DEVICE

(71) Applicant: Mitsubishi Electric Corporation, Tokyo (JP)

(72) Inventors: Tetsuya Higashino, Tokyo (JP); Ayako Inoue, Tokyo (JP); Tsubasa Morita, Tokyo (JP); Masahiro Nakatsukasa, Tokyo (JP); Hideki Fukuhara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 117 days.

(21) Appl. No.: 17/951,508

(22) Filed: Sep. 23, 2022

(65) Prior Publication Data

US 2023/0344911 A1 Oct. 26, 2023

(30) Foreign Application Priority Data

Apr. 22, 2022 (JP) .................................. 2022-070530

(51) Int. Cl.
  *H04L 67/00* (2022.01)
  *G06F 8/65* (2018.01)
  *H04L 67/12* (2022.01)

(52) U.S. Cl.
  CPC ............... *H04L 67/34* (2013.01); *G06F 8/65* (2013.01); *H04L 67/12* (2013.01)

(58) Field of Classification Search
  None
  See application file for complete search history.

(56) References Cited

U.S. PATENT DOCUMENTS

| | | | |
|---|---|---|---|
| 11,526,167 B1* | 12/2022 | Konrardy | B60W 30/16 |
| 2017/0232888 A1* | 8/2017 | Ricci | G08B 29/188 |
| | | | 705/27.1 |
| 2018/0018160 A1* | 1/2018 | Teraoka | G06F 9/445 |
| 2019/0108014 A1 | 4/2019 | Nakamura et al. | |
| 2023/0004373 A1* | 1/2023 | Yamamoto | G06F 8/65 |

FOREIGN PATENT DOCUMENTS

JP 2017-220092 A 12/2017

OTHER PUBLICATIONS

Halder et al., "Secure over-the-air software updates in connected vehicles: A survey," Elsevier, 2020, 19pg. (Year: 2020).*

* cited by examiner

*Primary Examiner* — Ryan D. Coyer
(74) *Attorney, Agent, or Firm* — Sughrue Mion, PLLC; Richard C. Turner

(57) ABSTRACT

The in-vehicle information processing device includes: a vehicle information acquisition unit for acquiring vehicle information including update information of software mounted in a vehicle and charge information of a battery, from an associated ECU, and determining a process not allowing the vehicle to travel and a recommended return time which is time when the vehicle is allowed to travel; a user action state estimation unit for acquiring a position of the vehicle and a user operation condition from an associated ECU, and estimating a user action state; and a user notification information generation unit for generating user notification information including information for assisting the user in action determination, on the basis of the process not allowing the vehicle to travel and the recommended return time, and the user action state.

4 Claims, 5 Drawing Sheets

FIG.2A

```
CURRENTLY YOU CANNOT DRIVE DUE
TO SOFTWARE UPDATE

ENJOY SHOPPING UNTIL 12:00
```

PROCESS NOT ALLOWING VEHICLE TO TRAVEL:SOFTWARE UPDATE
RECOMMENDED RETURN TIME:12:00
USER ACTION STATE:SHOPPING

FIG.2B

```
URRENTLY YOU CANNOT DRIVE DUE TO
BATTERY CHARGE

TAKE BREAK UNTIL 14:00
```

PROCESS NOT ALLOWING VEHICLE TO TRAVEL:BATTERY CHARGE
RECOMMENDED RETURN TIME:14:00
USER ACTION STATE:TAKING BREAK

FIG. 3

| PROCESS NOT ALLOWING VEHICLE 1 TO TRAVEL | NOTIFICATION SENTENCE 1 | RECOMMENDED RETURN TIME | USER ACTION STATE | NOTIFICATION SENTENCE 2 |
|---|---|---|---|---|
| SOFTWARE UPDATE BY OTA | CURRENTLY YOU CANNOT DRIVE DUE TO SOFTWARE UPDATE | 13:00 | SHOPPING | ENJOY SHOPPING UNTIL 13:00 |
| | | | TAKING BREAK | TAKE BREAK UNTIL 13:00 |
| BATTERY CHARGE | CURRENTLY YOU CANNOT DRIVE DUE TO BATTERY CHARGE | | SIGHTSEEING | ENJOY SIGHTSEEING UNTIL 13:00 |
| | | | EATING | MAKE YOURSELF COMFORTABLE UNTIL 13:00 |

```
SORRY
PROCESSING TIME OF SOFTWARE UPDATE
HAS BEEN EXTENDED

ENJOY SHOPPING UNTIL 12:30
```

IN-VEHICLE INFORMATION PROCESSING DEVICE

BACKGROUND OF THE INVENTION

1. Field of the Invention

The present disclosure relates to an in-vehicle information processing device.

2. Description of the Background Art

Complicated hardware mounted in an electric car, a plug-in hybrid car, or the like is precisely controlled by a computer. Thus, software is installed in the hardware. In recent years, there have been many hardware products in which software with advanced features, such as automatic driving and connected feature, is installed, and thus the software can have a large influence on automobile safety. Therefore, the software needs a bug fix and application of security patches to be promptly performed, and software update is performed by using an Over The Air (OTA) technology as one such means.

OTA technology is a technology for transmitting and/or receiving data via wireless communication. Use of OTA enables software update of a device in which software is installed, via wireless communication. During software update process by OTA, a vehicle is not allowed to travel. In the case where the vehicle is an electric car or a plug-in hybrid car, the vehicle is not allowed to travel also during a battery charge process. Such a software update process, such a battery charge process, and the like are each expressed as a process not allowing traveling. As a method to inform a user that the process not allowing traveling is being performed, an in-vehicle information processing device that reports progress of software update to a mobile terminal of the user is disclosed (for example, see Patent Document
Patent Document 1: Japanese Laid-Open Patent Publication No. 2017-220092

A conventional in-vehicle information processing device only reports progress of the process not allowing traveling to the mobile terminal of the user, and thus has a problem that information for assisting the user in action determination cannot be displayed before completion of the process not allowing traveling.

SUMMARY OF THE INVENTION

The present disclosure has been made to solve the above problem, and an object of the present disclosure is to provide an in-vehicle information processing device that can display the information for assisting a user in action determination before completion of the process not allowing traveling.

An in-vehicle information processing device according to one aspect of the present disclosure is an in-vehicle information processing device mounted in a vehicle provided with a plurality of ECUs. The in-vehicle information processing device includes: a vehicle information acquisition unit for acquiring vehicle information including update information of software mounted in the vehicle and charge information of a battery, from at least one of the plurality of ECUs, and determining a process not allowing the vehicle to travel and a recommended return time which is time when the vehicle is allowed to travel, from the vehicle information; a user action state estimation unit for acquiring a position of the vehicle and a user operation condition from at least one of the plurality of ECUs, and estimating a user action state from the position of the vehicle and the user operation condition; and a user notification information generation unit for generating user notification information including information for assisting the user in action determination, on the basis of the process not allowing the vehicle to travel and the recommended return time determined in the vehicle information acquisition unit, and the user action state estimated in the user action state estimation unit.

The in-vehicle information processing device according to one aspect of the present disclosure includes the user notification information generation unit for generating the user notification information including the information for assisting the user in action determination, on the basis of the process not allowing the vehicle to travel and the recommended return time determined in the vehicle information acquisition unit, and the user action state estimated in the user action state estimation unit. Thus, the in-vehicle information processing device can display the information for assisting the user in action determination before completion of the process not allowing traveling.

BRIEF DESCRIPTION OF THE DRAWINGS

FIGS. 2A and 2B show examples of user notification information of the in-vehicle information processing device according to the first embodiment;

FIG. 3 shows sentence examples of the user notification information of the in-vehicle information processing device according to the first embodiment;

DETAILED DESCRIPTION OF THE PREFERRED EMBODIMENTS OF THE INVENTION

Figure 1:
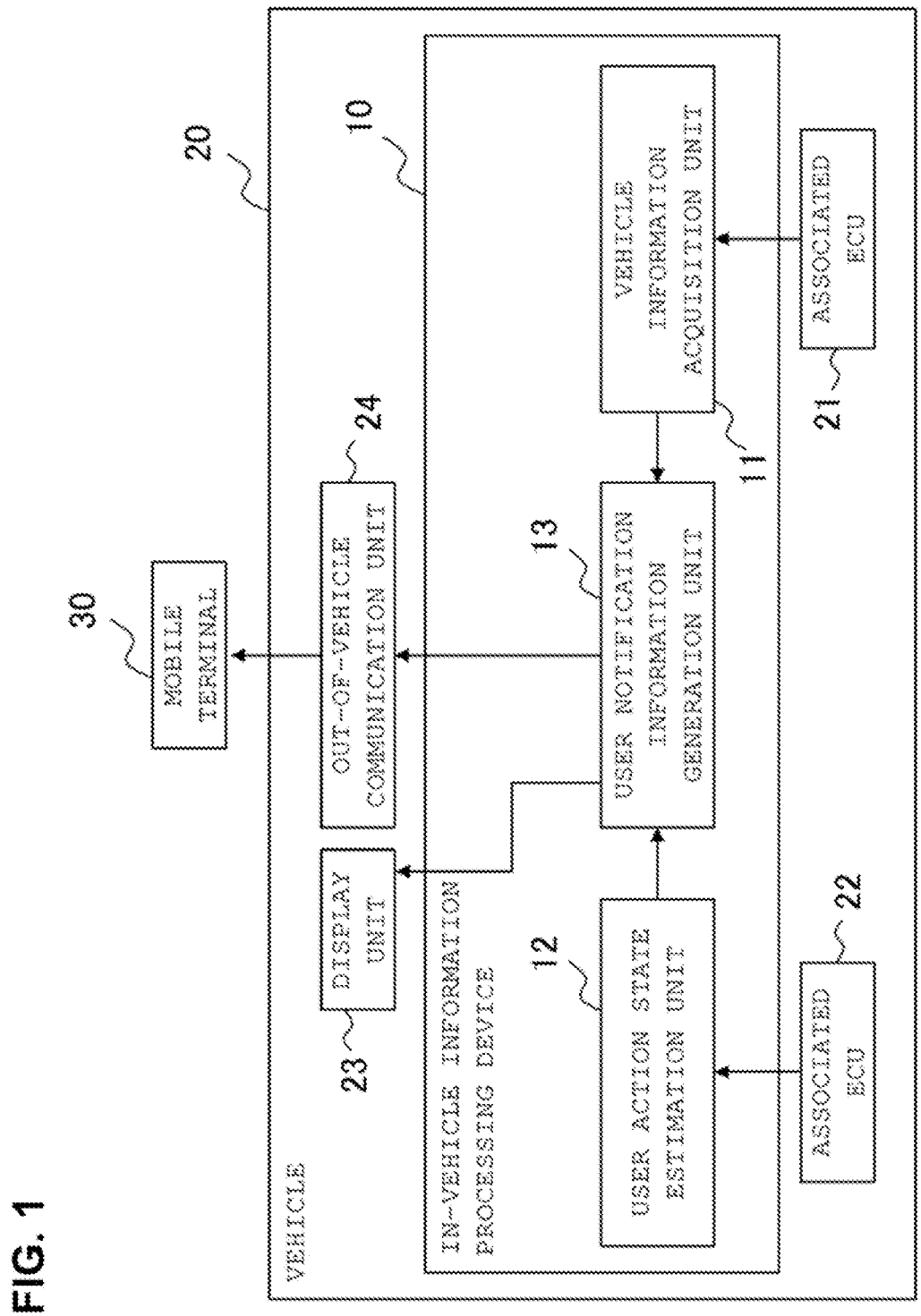
FIG. 1 is a configuration diagram of an in-vehicle information processing device according to a first embodiment of the present disclosure.

Hereinafter, an in-vehicle information processing device according to embodiments for carrying out the present disclosure will be described in detail, with reference to the drawings. It is noted that the same reference characters in the drawings denote the same or corresponding parts.

First Embodiment

FIG. 1 is a configuration diagram of an in-vehicle information processing device according to a first embodiment of the present disclosure. The in-vehicle information processing device 10 according to the present embodiment is mounted in a vehicle 20. The in-vehicle information processing device 10 includes a vehicle information acquisition unit 11, a user action state estimation unit 12, and a user notification information generation unit 13. The vehicle 20 includes an associated electronic control unit (ECU) 21 associated with the vehicle information acquisition unit 11, an associated ECU 22 associated with the user action state estimation unit 12, a display unit 23, and an out-of-vehicle communication unit 24. The ECU is a computer unit for electronically controlling each device mounted in a vehicle.

The vehicle information acquisition unit 11 acquires vehicle information from the associated ECU 21, and outputs a process not allowing a vehicle to travel and time when the vehicle is allowed to travel, to the user notification information generation unit 13. The time when the vehicle is allowed to travel outputted from the vehicle information acquisition unit 11 is hereinafter referred to as a recommended return time. Examples of the associated ECU 21 associated with the vehicle information acquisition unit 11 include an update master ECU and a charge management ECU. The update master ECU sends software update information including progress of software update by OTA and a scheduled update completion time of the software to the vehicle information acquisition unit 11. The charge management ECU sends battery charge information including a battery charge state and a scheduled charge completion time to the vehicle information acquisition unit 11. The vehicle information acquired by the vehicle information acquisition unit 11 includes the software update information and the battery charge information. The vehicle information acquisition unit 11 determines the recommended return time on the basis of the vehicle information acquired from the associated ECU 21. For example, when a software update process and a charge process are simultaneously performed, the vehicle information acquisition unit 11 determines a later one of their scheduled completion times as the recommended return time. At the same time, the vehicle information acquisition unit 11 determines the process having the later scheduled completion time as the process not allowing the vehicle to travel.

The user action state estimation unit 12 acquires information from the associated ECU 22 to estimate a user action state. Here, the user action state is information showing an action that a user is currently performing, such as shopping, taking a break, sightseeing, or eating, for example. Examples of the associated ECU 22 associated with the user action state estimation unit 12 include a navigation ECU and a driver monitoring system (DMS) ECU. The DMS is a system for monitoring a user (driver) operation condition by an in-vehicle camera. The user operation condition is a user operation condition associated with driving, such as gazing at a front side, feeling sleepy, or looking away, for example. The navigation ECU is an ECU for managing a navigation system, and sends information on a vehicle stop position and the like to the user action state estimation unit 12. The DMS ECU sends the user operation condition, such as gazing at a front side, feeling sleepy, or looking away to the user action state estimation unit 12.

The user action state estimation unit 12 estimates the user action state on the basis of information on the vehicle stop position acquired from the navigation ECU. For example, if the vehicle stop position is in a shopping complex, the user action state estimation unit 12 estimates that the user action state is shopping. In addition, the user action state estimation unit 12 estimates the user action state on the basis of the user operation condition acquired from the DMS ECU. For example, when the vehicle is stopped and the user operation condition is feeling sleepy, the user action state estimation unit 12 estimates that the user action state is taking a break. The user action state estimation unit 12 outputs the estimated user action state to the user notification information generation unit 13.

The user action state estimated in the user action state estimation unit 12 will be described. For example, when the vehicle stop position is in a shopping complex, the user action state estimation unit 12 estimates that the user action state is shopping. When the vehicle stop position is in a parking lot near a tourist spot, the user action state estimation unit 12 estimates that the user action state is sightseeing. When the vehicle stop position is in a parking lot of a restaurant, the user action state estimation unit 12 estimates that the user action state is eating. In addition, when the vehicle is stopped and the user operation condition acquired from the DMS ECU is feeling sleepy, the user action state estimation unit 12 estimates that the user action state is taking a break. However, the user action state estimated by the user action state estimation unit 12 is not limited thereto. For example, the user action state can be estimated to be exercising when the vehicle stop position is in a parking lot of a sports facility, and the user action state can also be estimated to be taking a break when the vehicle stop position is in a rest area or the like of an expressway.

When having acquired the process not allowing the vehicle to travel from the vehicle information acquisition unit 11, the user notification information generation unit 13 performs the following process. The user notification information generation unit 13 acquires the recommended return time from the vehicle information acquisition unit 11 and acquires the user action state from the user action state estimation unit 12. Then, the user notification information generation unit 13 generates user notification information including information for assisting the user in action determination, on the basis of the acquired process not allowing the vehicle to travel, recommended return time, and user action state. FIGS. 2A and 2B are examples of the user notification information generated by the user action state estimation unit 12. FIG. 2A is one example of the user notification information, when the process not allowing the vehicle to travel is software update by OTA, the recommended return time is 12:00, and the user action state is shopping. FIG. 2B is another example of the user notification information, when the process not allowing the vehicle to travel is battery charge, the recommended return time is 14:00, and the user action state is taking a break.

FIG. 3 shows sentence examples of the user notification information of the in-vehicle information processing device according to the present embodiment. In the present embodiment, the user notification information includes a notification sentence 1 and a notification sentence 2. The notification sentence 1 is prepared on the basis of the process not allowing the vehicle to travel, and the notification sentence 2 is prepared on the basis of the recommended return time and the user action state. The above information is stored in a storage unit inside or outside the user notification information generation unit 13 in advance. The user notification information generation unit 13 generates the user notification information by combining the notification sentence 1 and the notification sentence 2, on the basis of the acquired process not allowing the vehicle to travel, recommended return time, and user action state. As shown in FIG. 3, the notification sentence 2 includes the information for assisting the user in action determination, which is prepared on the basis of the user action state. The user notification information shown in FIGS. 2A and 2B and FIG. 3 is merely examples, and not limited thereto.

The user notification information generation unit 13 sends the generated user notification information to the display unit 23 and the out-of-vehicle communication unit 24 provided in the vehicle 20. The display unit 23 is, for example, a display unit of a navigation system. The out-of-vehicle communication unit 24 is, for example, the Internet, a wireless local area network (LAN), Bluetooth (registered trademark), or the like. The user notification information generation unit 13 performs display on the display unit 23, when the user is in the vehicle. The user notification information generation unit 13 transmits the user notification information to a mobile terminal 30 of the user via the out-of-vehicle communication unit 24, when the user is outside the vehicle. A positional relationship between the user and the vehicle can be detected by position information of, for example, a key-less key or a smart key of the vehicle.

The in-vehicle information processing device with such a configuration can report not only the process not allowing the vehicle to travel and the recommended return time but also the notification sentence prepared on the basis of the user action state, in the user notification information, and thus the information for assisting the user in action determination can be displayed before completion of a process not allowing traveling. Since the information for assisting the user in action determination is displayed, waiting time up to the time when the vehicle is allowed to travel is more likely to be beneficial time for the user, thereby reducing dissatisfaction that is caused by unavailability of the vehicle.

A conventional in-vehicle information processing device displays progress of software update by OTA by a percent indication. Since the progress of software update is displayed by a percent indication, the user can only roughly grasp the ending time of software update. In the in-vehicle information processing device according to the present embodiment, the user notification information includes the recommended return time, and thus the time when the vehicle is allowed to travel can be accurately grasped.

Second Embodiment

In the in-vehicle information processing device according to the first embodiment, the user notification information includes the process not allowing traveling and the recommended return time. Examples of the process not allowing traveling include software update by OTA and battery charge. In the in-vehicle information processing device according to the first embodiment, when processes not allowing traveling start, a later one of their scheduled completion times is determined as the recommended return time. However, regarding software update by OTA, the scheduled completion time may be changed by change in communication speed via wireless communication, reboot due to software update, or the like. In addition, regarding battery charge as well, the scheduled completion time can also be changed by change in the number of vehicles connected to a charging facility or the like. The in-vehicle information processing device according to a second embodiment of the present disclosure can notify the user of the changed scheduled completion time, if the scheduled completion time is changed after the process not allowing traveling starts.

Figure 4:
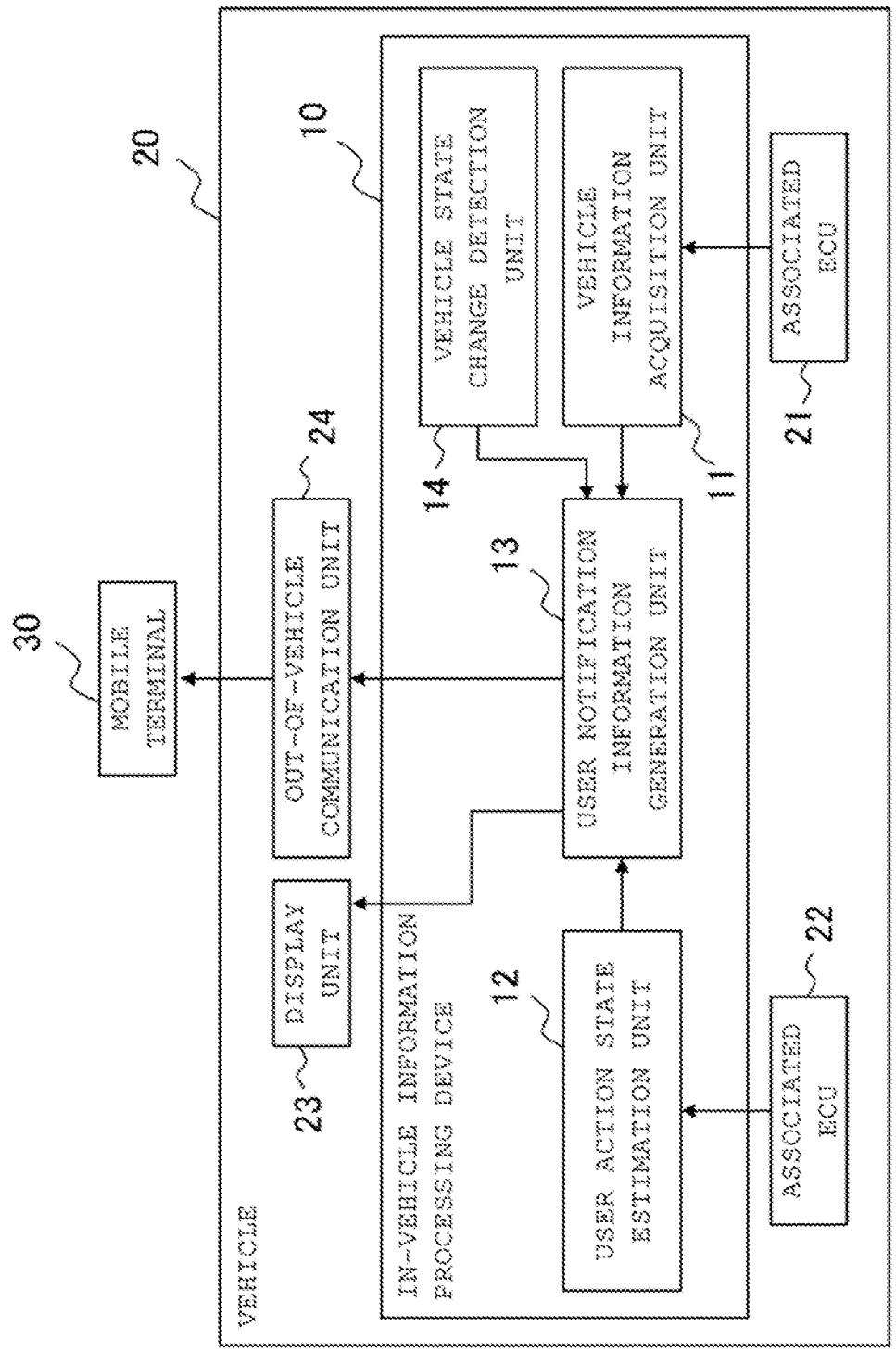
FIG. 4 is a configuration diagram of the in-vehicle information processing device according to a second embodiment of the present disclosure.

FIG. 4 is a configuration diagram of the in-vehicle information processing device according to the second embodiment. In the in-vehicle information processing device according to the second embodiment, a vehicle state change detection unit 14 is added to the in-vehicle information processing device described in the first embodiment.

The vehicle state change detection unit 14 commands the vehicle information acquisition unit 11 to periodically acquire the vehicle information from the associated ECU 21. The vehicle information acquisition unit 11 determines the process not allowing traveling and the recommended return time on the basis of the vehicle information acquired from the associated ECU 21. Then, when the recommended return time determined by the vehicle information acquisition unit 11 is changed, the vehicle state change detection unit 14 sends the changed recommended return time to the user notification information generation unit 13. Preferably, the vehicle state change detection unit 14 sets a threshold for a change amount of the recommended return time, and, only when the change amount of the recommended return time exceeds the threshold, sends the changed recommended return time to the user notification information generation unit 13. This threshold is, for example, 10 minutes. In addition, if the process not allowing traveling that is associated with the changed recommended return time has changed from the originally notified process not allowing traveling, the vehicle state change detection unit 14 preferably also sends the changed process not allowing traveling to the user notification information generation unit 13.

Figures 5, 6:
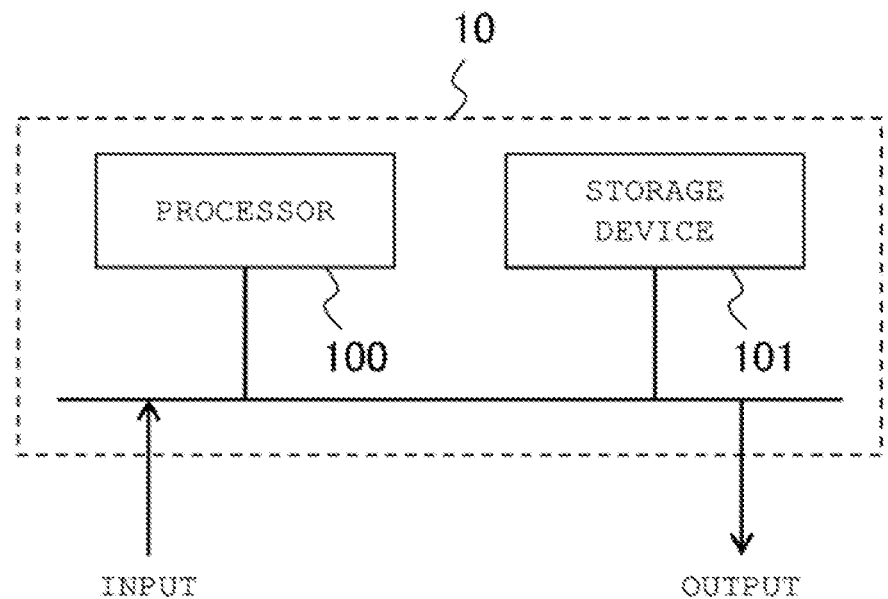
FIG. 5 shows an example of the user notification information of the in-vehicle information processing device according to the second embodiment.
FIG. 6 shows a hardware configuration that implements the in-vehicle information processing device according to the first and second embodiments.

The user notification information generation unit 13 further updates the user notification information on the basis of the recommended return time sent from the vehicle state change detection unit 14. FIG. 5 is one example of the user notification information generated by the user action state estimation unit 12 on the basis of the recommended return time sent from the vehicle state change detection unit 14. The user notification information shown in FIG. 5 is one example when the scheduled update completion time of software by OTA is extended from 12:00 to 12:30. Information on the sentence examples of the user notification information is stored in the storage unit inside or outside the user notification information generation unit 13 in advance. In the case where the changed process not allowing traveling is sent from the vehicle state change detection unit 14, the user notification information generation unit 13 preferably updates the user notification information so as to include the changed process not allowing traveling as well.

As in the first embodiment, the in-vehicle information processing device with such a configuration can display the information for assisting the user in action determination before completion of the process not allowing traveling. In addition, since the in-vehicle information processing device according to the second embodiment can notify the user of change in the recommended return time, the user can accurately grasp a period of time when the vehicle is not allowed to be used. For example, in the case where the recommended return time is accelerated, the user can know that the vehicle is allowed to be used earlier than when originally scheduled, thereby increasing effects to reduce dissatisfaction that is caused by unavailability of the vehicle. In addition, in the case where the recommended return time is delayed, the user can prevent waste time from occurring up to the time when the process not allowing the vehicle to travel terminates.

As one example of hardware shown in FIG. 6, the in-vehicle information processing device 10 includes a processor 100 and a storage device 101. Although not shown, the storage device includes a volatile storage device such as a random access memory and a nonvolatile auxiliary storage device such as a flash memory. In addition, the storage device may have an auxiliary storage device of a hard disk instead of a flash memory. The processor 100 executes a program inputted from the storage device 101. In this case, the program is inputted to the processor 100 from the auxiliary storage device via the volatile storage device. In addition, the processor 100 may output data such as a calculation result to the volatile storage device of the storage device 101, or store the data into the auxiliary storage device via the volatile storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 10 in-vehicle information processing device
11 vehicle information acquisition unit
12 user action state estimation unit
13 user notification information generation unit
14 vehicle state change detection unit
20 vehicle
21, 22 associated ECU
23 display unit
24 out-of-vehicle communication unit
30 mobile terminal
100 processor
101 storage device

What is claimed is:

1. An in-vehicle information processing device mounted in a vehicle provided with a plurality of electronic control units (ECUs), the in-vehicle information processing device comprising:
    a vehicle information acquisition circuitry to acquire vehicle information including update information of software mounted in the vehicle and charge information of a battery, from at least one of the plurality of ECUs, and determining a process not allowing the vehicle to travel and a recommended return time which is time when the vehicle is allowed to travel, from the vehicle information;
    a user action state estimation circuitry to acquire a position of the vehicle and a user operation condition from at least one of the plurality of ECUs, and estimating a user action state from the position of the vehicle and the user operation condition; and
    a user notification information generation circuitry to generate user notification information including information for assisting the user in action determination, on the basis of the process not allowing the vehicle to travel and the recommended return time determined in the vehicle information acquisition circuitry, and the user action state estimated in the user action state estimation circuitry.

2. The in-vehicle information processing device according to claim 1, further comprising a vehicle state change detection circuitry to detect that the recommended return time determined by the vehicle information acquisition circuitry is changed, and sending the changed recommended return time to the user notification information generation circuitry, wherein
    the user notification information generation circuitry updates the user notification information on the basis of the recommended return time sent from the vehicle state change detection circuitry.

3. The in-vehicle information processing device according to claim 1, wherein
    the user notification information generation circuitry generates the user notification information by combining first notification information stored in advance correspondingly to the process not allowing the vehicle to travel, and second notification information stored in advance correspondingly to the recommended return time and the user action state.

4. The in-vehicle information processing device according to claim 2, wherein
    the user notification information generation circuitry generates the user notification information by combining first notification information stored in advance correspondingly to the process not allowing the vehicle to travel, and second notification information stored in advance correspondingly to the recommended return time and the user action state.

* * * * *